United States Patent [19]

Tagawa

[11] Patent Number: 4,768,395
[45] Date of Patent: Sep. 6, 1988

[54] BICYCLE SPEED CHANGE LEVER ASSEMBLY

[75] Inventor: Koichi Tagawa, Kawachinagano, Japan

[73] Assignee: Maeda Industries, Ltd., Osaka, Japan

[21] Appl. No.: 897,875

[22] Filed: Aug. 19, 1986

[30] Foreign Application Priority Data

Feb. 14, 1986 [JP] Japan ................................. 61-31717

[51] Int. Cl.$^4$ ........................................... G05G 11/00
[52] U.S. Cl. ........................................ 74/489; 74/527; 74/502.2
[58] Field of Search .............. 74/527, 475, 489, 501 B

[56] References Cited

U.S. PATENT DOCUMENTS

| | | | |
|---|---|---|---|
| 3,180,166 | 4/1965 | Fox | 74/527 X |
| 3,534,627 | 10/1970 | Schwerdhofer | 74/489 X |
| 3,602,245 | 8/1971 | Meisel | 74/527 X |
| 4,222,286 | 9/1980 | Huret | 74/501 B |
| 4,232,564 | 11/1980 | Yamasaki | 74/527 X |
| 4,325,267 | 4/1982 | Kojima | 74/489 |
| 4,343,201 | 8/1982 | Shimano | 74/527 X |
| 4,454,784 | 6/1984 | Shimano | 74/527 X |
| 4,470,823 | 9/1984 | Shimano | 74/475 X |
| 4,548,092 | 10/1985 | Strong, Jr. | 74/475 |
| 4,613,319 | 9/1986 | Nagano | 74/527 X |

FOREIGN PATENT DOCUMENTS

| | | | |
|---|---|---|---|
| 485444 | 8/1952 | Canada | 74/489 |
| 459562 | 9/1950 | Italy | 74/489 |
| 567858 | 10/1957 | Italy | 74/489 |
| 60-209376 | 10/1985 | Japan . | |
| 60-209377 | 10/1985 | Japan . | |
| 61-33380 | 2/1986 | Japan . | |
| 2169065 | 7/1986 | United Kingdom | 74/489 |

Primary Examiner—Gary L. Smith
Assistant Examiner—Rodney M. Lindsey
Attorney, Agent, or Firm—Birch, Stewart, Kolasch, & Birch

[57] ABSTRACT

A bicycle speed change lever assembly comprising a fixed support shaft, a lever mount non-rotatably mounted on the support shaft, a control lever having a cylindrical boss portion rotatably mounted on the lever mount, a click ring mounted on the lever mount for co-rotation with the lever and having a plurality of differently patterned arcuate rows of clicking recesses, a non-rotatable retainer disposed on the lever mount in facing relation to the recesses of the click ring and loosely retaining steel balls in corresponding relation to the rows of clicking recesses, and a rotationally operable mode selector disposed in facing relation to a front or outward surface of the retainer and having at least one backup portion for forcing a selected one of the balls into elastic abutment with the click ring, wherein one of the differently patterned arcuate rows of clicking recesses is selected when in use.

9 Claims, 7 Drawing Sheets

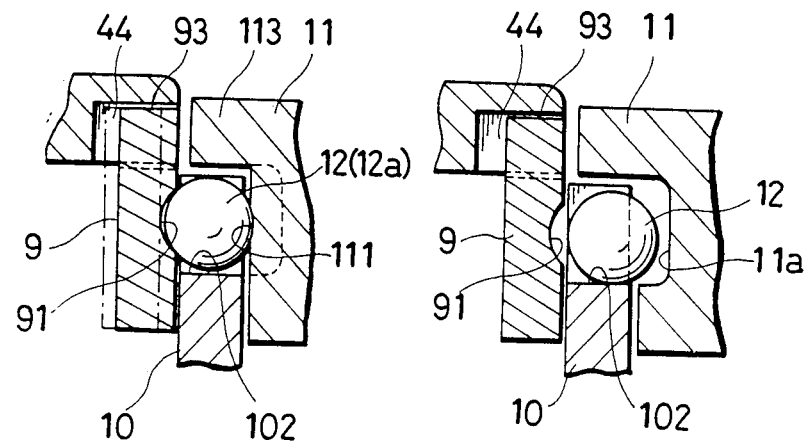
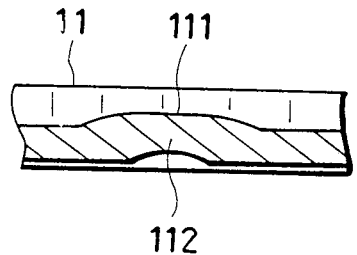
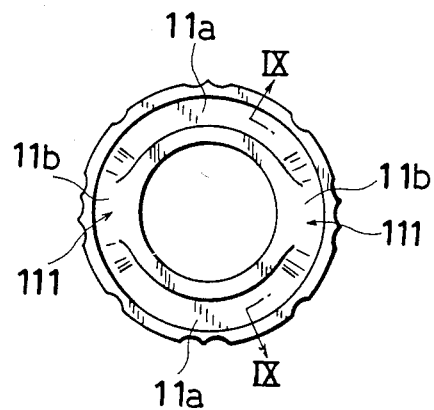

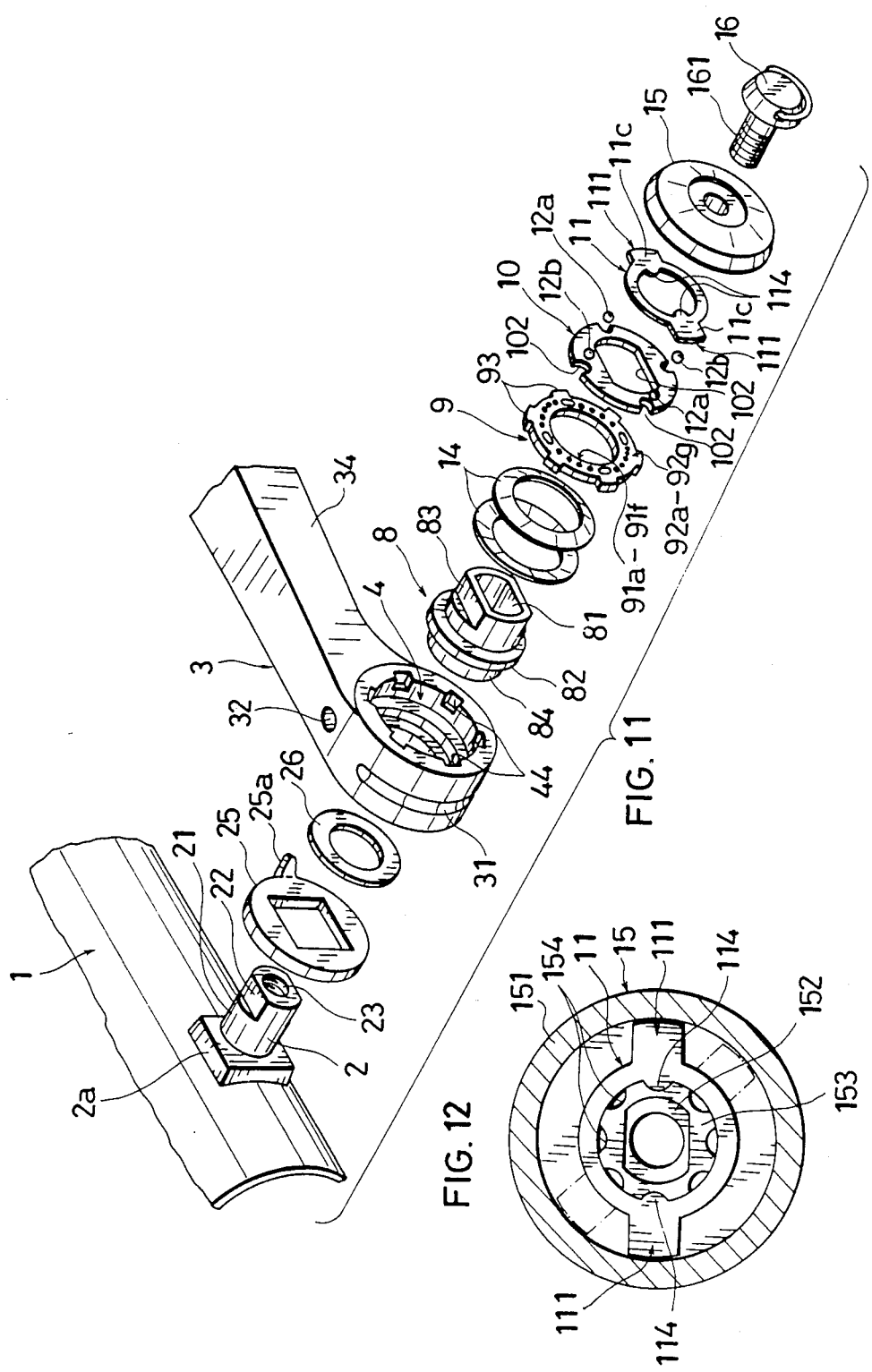

BICYCLE SPEED CHANGE LEVER ASSEMBLY

BACKGROUND AND SUMMARY OF THE INVENTION

1. Field of the Invention

This invention relates to a bicycle speed change lever assembly, and more particularly to improvements in the lever assembly for operating a derailleur to shift a drive chain from one to another of diametrically different sprockets of a multiple freewheel or a multiple chainwheel. More specifically, the invention is directed to a bicycle speed change lever of the type that is readily applicable to different types of derailleurs by a simple change in operational mode.

2. Prior Art

As is well-known, bicycles are equipped in many cases with a speed change mechanism to enable cycling suited to a particular road condition or to a cyclist's desire. Such speed change mechanism includes for example a rear derailleur of the type that comprises a shiftable cage rotatably supporting a pair of guide pulleys and a control mechanism such as a parallelogrammic linkage mechanism for displacing the guide pulleys laterally of a multiple freewheel to shift a drive chain engaging with the pulleys from one sprocket to another of the freewheel. The speed change mechanism may further comprise a pair of parallel guide plates and a control mechanism such as a parallelogrammic linkage mechanism, similar to that of the rear derailleur, for displacing the guide plates laterally of a multiple chainwheel to shift the drive chain from one sprocket to another of the chainwheel.

The movement of the guide pulleys or the guide plates is controlled by a control lever which is operatively connected to the parallelogrammic linkage mechanism via a control cable a part of which extends along a cable winding groove formed in an outer circumference of a cylindrical boss portion of the control level which has a handle portion extending radially from the boss portion. The control lever is pivotally mounted at the boss portion to a suitable part of a bicycle frame. When the control lever is pivoted, the cable is wound up along the winding groove onto the boss portion or paid out therefrom to vary tension of the cable thereby to regulate the parallelogrammic linkage so that it is correspondingly deformed to bring the guide pulleys or the guide plates to a lateral position predetermined by the pivotal position of the control lever.

Normally, the control lever is pivoted steplessly. It is, thus, quite difficult for an unskillful cyclist to operate the control lever to bring the guide pulleys or the guide plates to an optimum position relative to each sprocket of the multiple freewheel or the multiple chainwheel. As such, the guide pulleys or the guide plates are sometimes stopped erroneously at a position intermediate two adjacent sprockets, failing to effect intended shifting of the drive chain onto a selected sprocket of the multiple freewheel or the multiple chainwheel. This gives rise to objectionable gear noises or unwanted vibration of the drive chain.

In order to improve the maneuverability of the control lever, it has been proposed to incorporate into the lever assembly a click mechanism which serves to clickingly hold the control lever at each of predetermined pivotal positions, as disclosed for example in Japanese Patent Applications Laid-open Nos. 60-209376 (Application No. 59-67162 filed Apr. 3, 1984, Inventor: Masashi Nagano), 60-209377 (Application No. 59-67163 filed Apr. 3, 1984, Inventor: Masashi Nagano), and 61-33380 (Application No. 59-156222 filed July 25, 1984, Inventor: Masashi Nagano). With the use of the click mechanism, any cyclist, skilled or unskilled, can easily operate the control lever to bring the guide pulleys or the guide plates accurately to an optimum position immediately under a selected sprocket of the multiple freewheel or the multiple chainwheel and thereby conduct desired speed change.

The conventional lever assembly incorporating the click mechanism enables pivotal movement of the control lever only in a single click pattern and is thus applicable only to a single type of derailleur associated with a specific type of multiple freewheel (or multiple chainwheel). In other words, the known clicking lever assembly, if designed to suit a five-sprocket freewheel for example, is no longer applicable to a seven-sprocket freewheel for example. Further, the clicking lever assembly becomes inoperative if the associated derailleur is replaced by another type of derailleur since the two derailleurs differ from each other in the amount of displacement of respective guide pulleys per unit amount of pivotal movement of the control lever.

SUMMARY OF THE INVENTION

It is, therefore, an object of the present invention to provide a speed change lever assembly which is selectively operable in one of two or more click patterns to enable replacement of a multiple freewheel and/or a rear derailleur.

Another object of the invention is to provide a speed change lever assembly which is selectively operable in one of two or more click patterns to enable replacement of a multiple chainwheel and/or a front derailleur.

A further object of the invention is to provide a speed change lever assembly which enables selection of the click patterns by a simple operation.

According to the present invention, a bicycle speed change lever assembly is provided which comprises: a support shaft fixed to a bicycle frame; a control lever having a hollow base portion rotatable about the support shaft and having a handle portion integral with and extending from the boss portion; an annular internal space formed in the boss portion; a click member accommodated within the internal space and co-rotatable with the boss portion, the click member having an operative surface provided with at least two arcuate rows of clicking recesses which are disposed in angularly displaced zones and different in pattern; a retainer disposed in facing relation to the operative surface of the click member and non-rotatable relative to the support shaft; a plurality of rolling elements loosely retained by the retainer in corresponding relation to the rows of clicking recesses and having a diameter larger than a wall thickness of the retainer; a mode selector disposed adjacent to the retainer so that the retainer is interposed between the mode selector and the click member, the mode selector being angularly adjustable to take a selected one of angular positions; and means for locking the mode selector at the selected one of angular positions; wherein the mode selector is formed with at least one backup portion for forcing a selected one of the rolling elements into elastic abutment with the operative surface of the click member.

Other objects, features and advantages of the present invention will become apparent from the description of preferred embodiments given with reference to the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is an enlarged fragmentary section of the lever assembly in a state for clicking operation;

FIG. 7 is a view similar to FIG. 6 but showing the lever assembly in a state for non-clicking operation;

FIG. 8 is an elevation showing a backup side of a mode selector;

FIG. 9 is an enlarged fragmentary section taken on lines IX—IX in FIG. 8;

FIG. 11 is an exploded perspective view of the modified embodiment of FIG. 10; and FIG. 12 is a reduced cross section taken on lines XII—XII in FIG. 10.

DESCRIPTION OF THE PREFERRED EMBODIMENTS

Figure 1:
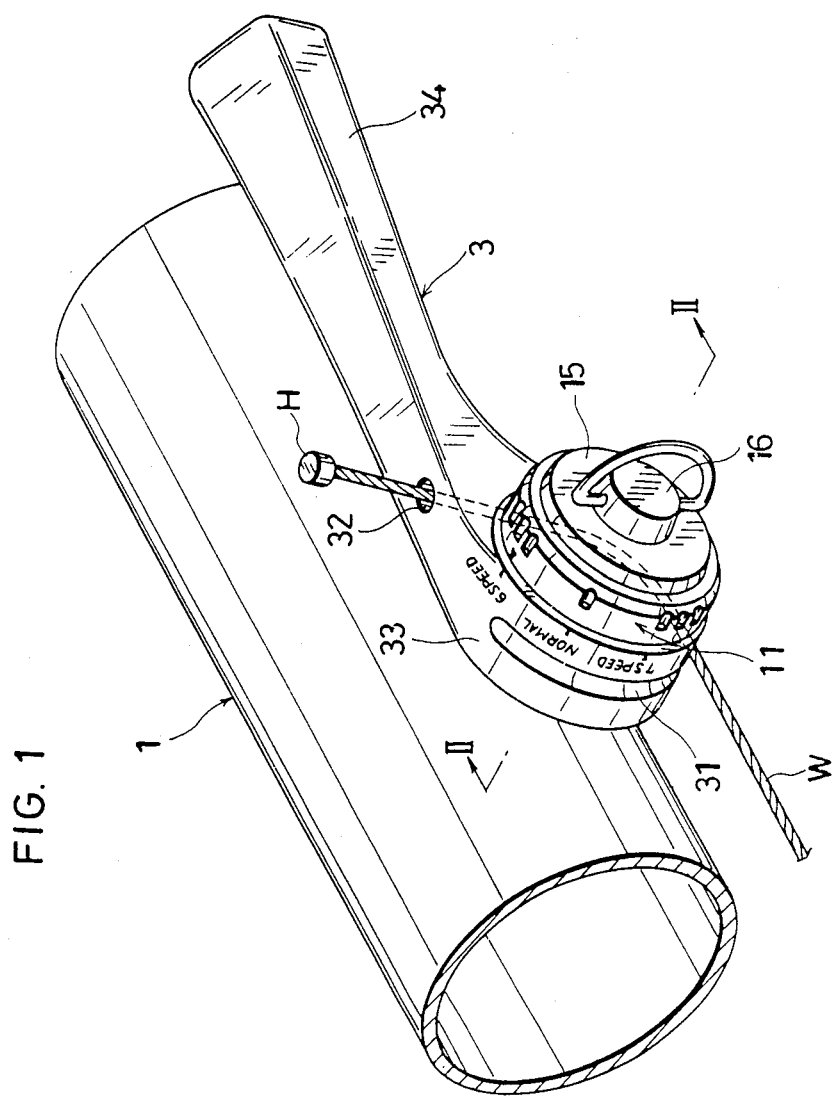
FIG. 1 is an overall perspective view of a bicycle speed change lever assembly embodying the invention.

Referring now to FIGS. 1 to 9, a bicycle speed change lever assembly according to the present invention is illustrated as having a support shaft 2, a control lever 3, a ratchet mechanism 5, and a click mechanism 6. The control lever 3 is pivotal on the support shaft 2 to wind up or loosen a control cable W, so that a pair of guide pulleys of a known, unillustrated rear derailleur are displaced laterally to shift an unillustrated drive chain from one sprocket to another of a known multiple freewheel (not shown), or so that a pair of unillustrated guide plates of a known, unillustrated front derailleur are displaced laterally to shift the chain from one sprocket to another of a known multiple chainwheel (not shown), conventionally.

The support shaft 2 is rigidly secured to a suitable part 1, such as a down tube, or a bicycle frame directly by brazing an illustrated rectangular shaft base 2a to the frame part 1 or indirectly by means of a known, unillustrated clamp band which can be tightly mounted onto the frame part 1 with the aid of a clamp screw and a nut (not shown), conventionally. The shaft 2 has a cylindrical rear portion 21 and a partially flattened front portion 22 which is oblong in cross section and formed internally with a threaded axial bore 23.

The control lever 3 has a cylindrical boss portion 33 which is formed externally with a circumferential groove 31 for guiding the control cable W. A handle portion 34 of the lever 3 extends from the boss portion 33, conventionally. The handle portion 34 is provided adjacent to the boss portion 33 with a stepped accommodation hole 32 for anchoring in its larger diameter space a stopper head H attached to one end of the control cable W.

Figure 2:
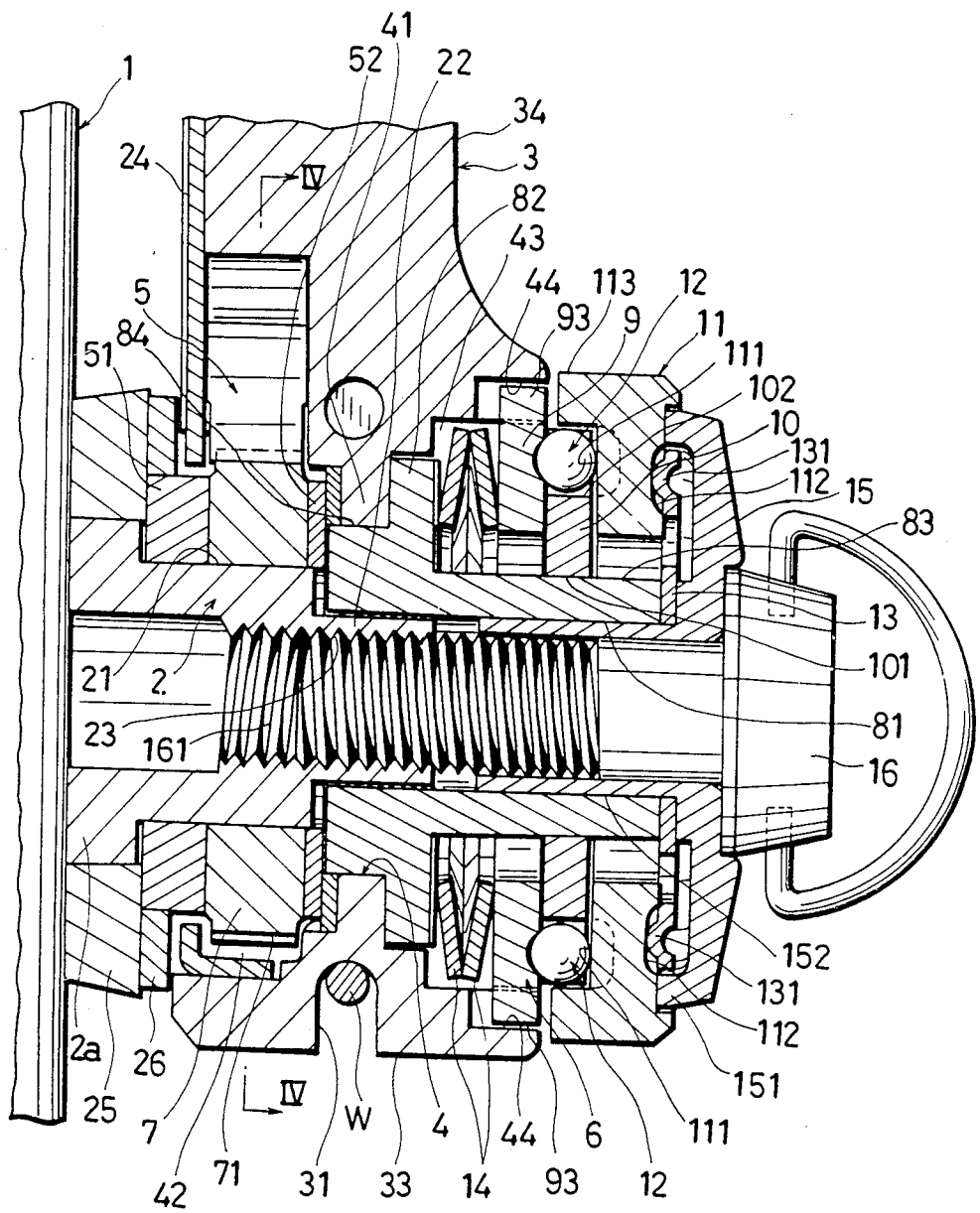
FIG. 2 is an enlarged, fragmentary section taken on lines II—II in FIG. 1.

The boss portion 33 is further formed with an axial through-hole 4 which is divided by an annular internal partition flange 41 into a first chamber 42 and a second chamber 43, as best illustrated in FIG. 2. The first chamber 42 houses the ratchet mechanism 5, whereas the second chamber 43 accommodates the click mechanism 6 which features the present invention.

Figure 4:
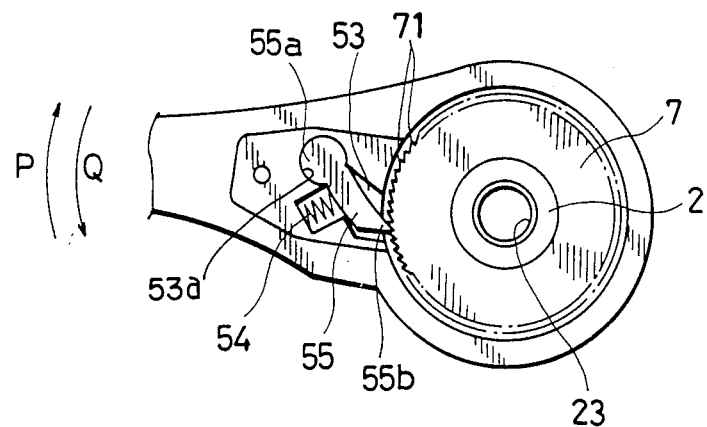
FIG. 4 is a reduced section taken on lines IV—IV in FIG. 2 to illustrate a ratchet mechanism.

The ratchet mechanism 5 includes a ratchet roller 7 having a number of teeth 71 formed on its outer circumference and rotatably mounted on the cylindrical rear portion 21 of the support shaft 2. The ratchet roller 7 is sandwiched between a pair of friction rings 51, 52 which are on the rear portion 21 in pressing contact with the roller 7. The first chamber 42 of the boss portion 33 communicates with a seating space 53 formed adjacent thereto for receiving a ratchet pawl 55, as illustrated in FIG. 4. The seating space 53 has a substantially circular portion 53a while the pawl 55 has a corresponding circular base 55a relatively rotatable in the circular portion 53a, so that the pawl 55 is pivotal within a limited angular range. A coil spring 54 urges the pawl 55 in one direction to keep its front edge 55b in engagement with teeth 71 of the ratchet roller 7.

The ratchet mechanism 5 enables the control lever 3 to pivot in a cable winding direction, i.e., the direction of the arrow P in FIG. 4, independently of the ratchet roller 7, so that such pivotal movement of the control lever 3 against the tensile force imparted to the control cable W can be conducted without involving any frictional resistance between the ratchet roller 7 and the friction rings 51, 52. On the other hand, the control lever 3 pivots in the direction of the arrow Q to cause rotation of the ratchet roller 7, whereby the frictional resistance produced between the roller 7 and the friction 51, 52 prevents the control lever 3 from unintentionally pivoting in the direction Q under influence of the tensile force imparted to the control cable W. The pawl 55 is prevented from accidentially coming out of the seating space 53 by an extension 24a of a ratchet cover 24 (FIG. 3) attached to the control lever 3. Indicated at 25 is a detent washer fitted onto the rectangular base 2a of the support shaft 2 while indicated at 26 is a spacer washer for adjustment of a clearance between the detent washer 25 and the cover 24. Reference numeral 25a designates a stopper ear engageable with a lower side of the handle portion 34 of the control lever 3 for restriction of an excessive downward rotation of the lever 3.

A lever mount 8 has an axial through-hole 81 corresponding in cross-sectional shape to the front portion 22 of the shaft 2 for non-rotatable but slidable mounting of the lever mount on the support shaft 2. The lever mount 8 also has an outward collar 82 formed integrally at an intermediate portion thereof, a flattened front portion 83 disposed on one side of the collar 82, and a cylindrical rear portion 84 arranged on the other side of the collar 82 and closely fittable in the inward flange 41 to project partially into the first chamber 42 of the boss portion 33. Thus, when the lever mount 8 is inserted into the second chamber 43 of the boss portion 33, the outward collar 82 comes into abutment with the inward flange 41, whereas the cylindrical rear portion 84 comes into pressing contact with the friction ring 52 to produce a frictional resistance between the ratchet roller 7 and both of the friction rings 51, 52. In this condition, an annular internal space if formed within the first chamber 43 around the front portion 83 of the lever mount 8. It will be apparent that the axial through-hole 81 of the lever mount 8 as well as the front portion 22 of the support shaft 2 can take any other cross-sectional shape which enables non-rotatable mounting of the lever mount 8 on the support shaft 2. Similarly, the front portion 83 of the lever mount 8 may also take any other non-circular form in cross section than that illustrated in FIG. 3.

The click mechanism 6 is arranged on the flattened front portion 83 of the lever mount 8 and includes a click ring 9, a retainer 10, a ring-form mode selector 11, and a plurality of rolling elements 12 including those designated by reference numerals 12a, 12b as will be hereinafter described.

The click ring 9 is provided on its outer circumference with a plurality of angularly spaced integral ears 93 engageable with a plurality of corresponding notches 44 formed in the wall thickness of the lever boss portion 33 in the second chamber 43. When the ears 93 are in engagement with the notches 44, the click ring 9 is co-rotatable with the control lever 3 and axially slidable along the notches 44 within a slight range defined by an axial length of the notches 44.

Figure 3:
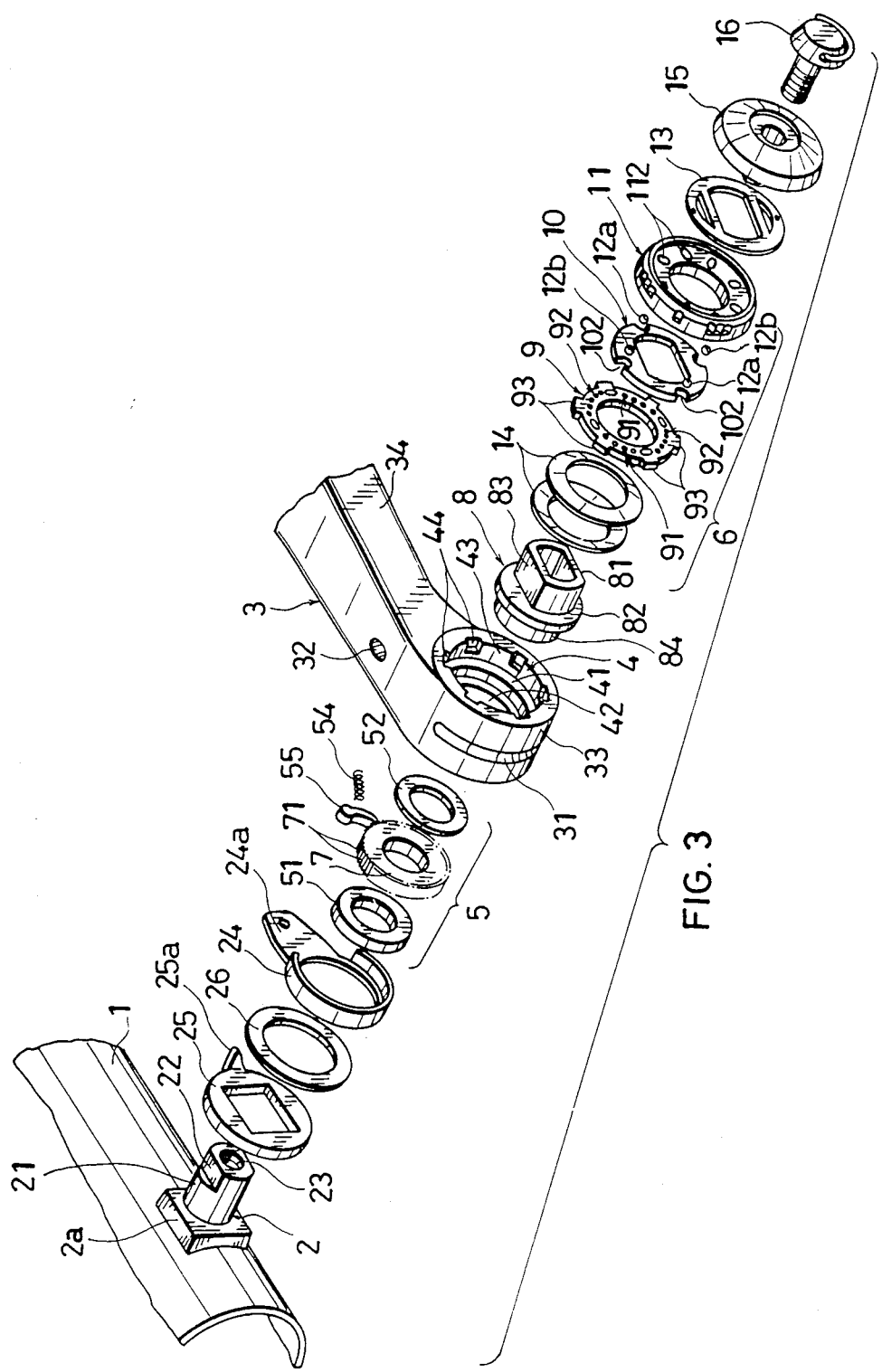
FIG. 3 is an exploded perspective view of the lever assembly.

In the illustrated embodiment, the click ring 9 is further provided on its front or forward side surface with four groups of clicking recesses generally represented by reference numerals 91, 92 as shown in FIG. 3. More specifically, each of the two groups 91 includes the clicking recesses 91a–91f while each of the groups 92 includes the clicking recesses 92a–92g, the four groups 91, 92 being in angularly different zones A, A', B, B' each defined by a quarter or circle, respectively, as clearly shown in FIG. 5. The recesses in each zone are aligned in an arcuate row. Such rows, four in total, surround the support shaft 2. The two groups of the recesses 91 in the diametrically opposite zones A, A', are identical in arrangement and respectively have six clicking recesses 91a–91f for six stage speed change, whereas the remaining two groups of the recesses 92 in the other diametrically opposite zones B, B' respectively have seven clicking recesses 92a–92g in identical arrangement for seven stage speed change. For simplification of the arrangement, an elongated clicking recess 91 may be provided at the boundary between each two adjacent zones to be commonly used for the corresponding two recess groups, as illustrated.

The retainer 10 has a central opening 101 shaped to enable non-rotatable mounting of the retainer 10 onto the flattened front portion 83 of the lever mount 8. The retainer 10 is in facing relation to the front or outward surface of the click ring 9.

The outer peripheral portion of the retainer 10 is formed with a plurality of equiangularly spaced, U-shaped cutouts 102 for loosely receiving the rolling elements 12 which, according to the illustrated example, are in the form of steel balls 12a, 12b each for one of the recess groups 91a–91f, 92a–92g of the click ring 9. A diameter of the steel balls 12a, 12b is larger than the wall thickness of the retainer 10. If desired, the steel balls may be replaced by rollers (not shown).

The ring-form mode selector 11 is rotatably mounted on the front portion 83 of the lever mount 8 so as to face the front or outward surface of the retainer ring 10. Thus, the retainer ring 10 is sandwiched between the click ring 9 and the mode selector 11. As illustrated in FIG. 6 to 9, the mode selector 11 has a pair of diametrically opposite backup portions 111 on its rear or inward surface that faces the retainer 9. More specifically, the backup portions 111 in the illustrated example are provided by a pair of diametrically opposed bulges 11b formed at the boundaries of a pair of symmetrically arranged arcuate grooves 11a for receiving the balls 12a, 12b, so that the backup bulges 111 forces selected two of the balls, i.e., the balls 12a or 12b, against the click ring 9. The other side surface (front or forward surface) of the mode selector 11 is formed with positioning recesses 112 disposed in a circular row at an angular interval of 45 degrees. These recesses 112 are cooperative with a locking plate 13 for the purpose to be described hereinafter. The outer peripheral portion of the mode selector 11 is formed with a cylindrical inward extension 113 which surrounds the ball retainer 10 to restrain the radial displacement of the balls 12.

Between the click ring 9 and the collar 82 of the lever mount 8 are disposed a pair of opposed belleville springs 14 acting to urge the click ring 9 toward the mode selector 11.

The above described components of the lever assembly are clamped together by means of a presser cover 15 and a clamping bolt 16. The presser cover 15 has an inwardly directed annular projection 151 whose inward face is in sliding contact with the front or outward surface of the mode selector 11. The cover further has an axial hollow projection 152 which corresponds in cross section to and extends non-rotatably into the oblong through-hole 81 of the lever mount 8. On the other hand, the bolt 16 has a threaded shank 161 insertable through the hollow central projection 152 of the cover 15 into screw engagement with the threaded bore 23 of the support shaft 2.

The mode selector 11 is rotatable on the lever mount 8 as already described but also lockable at an angular interval of 45 degrees. For this purpose, the locking member 13 is non-rotatably mounted on the partially flattened hollow projection 152 of the presser cover 15 in facing relation to the front or outward surface of the mode selector 11. The locking member 13 is provided with a pair of diametrically opposite protuberances 131 which are elastically engageable with a selected pair of the positioning recesses 112 of the mode selector 11 and which are forcibly disengageable therefrom when the mode selector 11 is angularly moved so that the protuberances 131 can be engaged with another selected pair of the positioning recesses 112.

Figure 5:
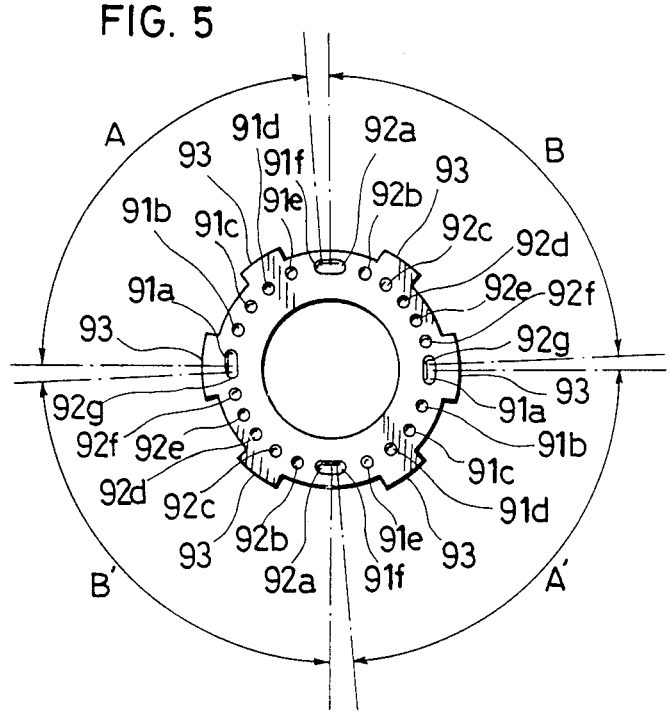
FIG. 5 is an explanatory elevation showing an example of click pattern arrangement.

In operation, when the mode selector 11 is rotated and locked so that its backup bulges 111 force the pair of balls 12a only into elastic abutment with the click ring 9 in the angular zones A, A' as illustrated in FIGS. 5 and 6, the remaining pair of balls 12b are allowed to retract into the respective arcuate grooves 11a of the mode selector 11. In this state, pivotal movement of the control lever 3 accompanied by the rotation of the click ring 9 causes each of the balls 12a to clickingly engage in and disengage from each of the six clicking recesses 91a–91f in each angular zone A or A'. This enables a cyclist to adjust the control lever 3 to an exact gear position among six corresponding to a particular sprocket of a six-sprocket freewheel.

When the mode selector 11 is rotated from the previous position through 90 degrees in either rotational direction and locked there by engagement between a pair of relevant positioning recesses 112 of the mode selector 11 and the engaging protuberances 131 of the locking member 13, the mode selector 11 now backs up the pair of balls 12*b* in the angular zones B, B' at the backup bulges 111 while permitting the remaining balls 12*a* to retreat into the arcuate grooves 11*a* of the selector 11. In such a condition, rotation of the click ring 9 attendant with pivotal movement of the control lever 3 causes each of the balls 12*b* to clickingly engage in and disengage from each of the seven clicking recesses 92*a*–92*g* in each angular zone B or B'. Thus, this clicking mode gives an exact selection among the seven gear positions of the control lever 3 corresponding to a particular sprocket of a seven-sprocket freewheel.

In addition to the above described clicking modes, the mode selector 11 may be set to a non-clicking mode by turning it through 45 degrees in either rotational direction from each of the two positions previously described. In this condition, all the balls 12*a*, 12*b* are allowed to retreat into the arcuate grooves 11*a* of the selector 11 and thus are free of clicking engagement with any of the clicking recesses 91*a*–91*f*, 92*a*–92*g*, which results in that the control lever 3 can be brought to and frictionally held in any pivotal position. Such a non-clicking mode is advantageously selected for example in case the length of the control cable W spanning between the control lever 3 and the unillustrated derailleur is unexpectedly increased to cause a positional deviation of the derailleur pulley from an intended gear position corresponding to each clicked pivotal position of the control lever 3.

Figure 10:
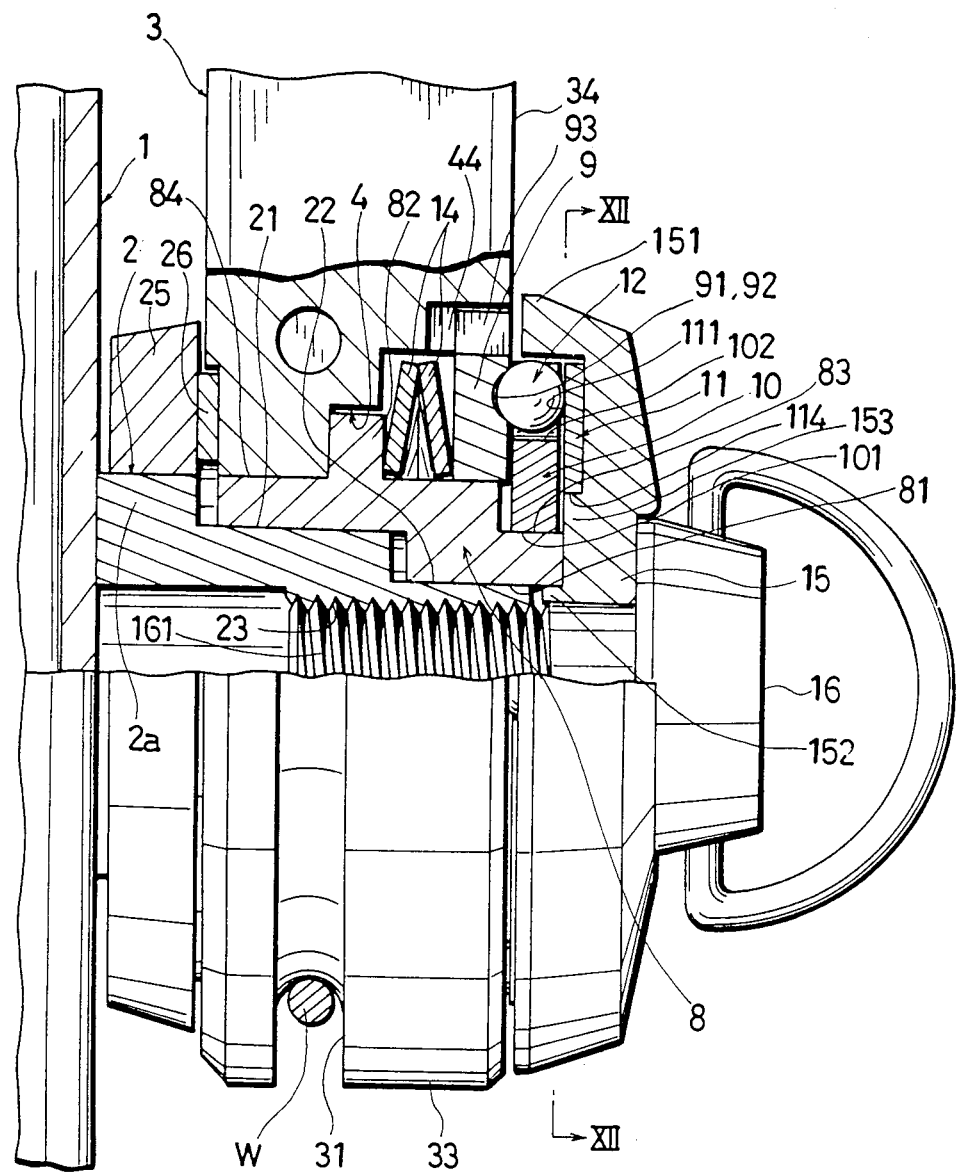
FIG. 10 is an enlarged fragmentary elevation, partly in section, illustrating a modified embodiment of the invention.

FIGS. 10 to 12 illustrate a modified embodiment of the invention which differs from foregoing embodiment in that the ratchet mechanism 5 is omitted and the mode selector 11 is varied in structure. The same reference numerals and characters as used in FIGS. 1 thru 9 are also used in FIGS. 10 to 12 to designate structural elements which are identical or substantially identical to those as illustrated in FIGS. 1 thru 9.

According to the modified embodiment, a presser cover 15 centrally has an annular first projection 153 which extends axially inwardly into abutment with the outward end face of the lever mount 8 and which is formed circumferentially with a plurality of equiangularly spaced spline grooves 154 at an angular interval of 45 degrees. The cover 15 further has a second projection 152 which is hollow and partially flattened and which extends axially inwardly from the first projection 153 into the oblong through-hole 81 of the lever mount 8 for non-rotatable engagement therewith. The cover 15 also has an external, cylindrical extension 151 surrounding the retainer ring 10 to restrain unexpected radial displacement of the steel balls 12.

A mode selector 11, which is in the form of a ring plate fitting on the first projection 153 of the cover 15, is formed on its inner circumference with a pair of diametrically opposite positioning projections 114 fittable into a selected pair of the spline grooves 154. The outer circumference of the mode selector 11 is provided with a pair of diametrically opposite backup portions 111 which are in the form of a pair of tongues 11*c* projecting radially outwardly defining grooves therebetween. Thus, by adjusting the angular position of the mode selector 11 relative to the cover 15, it is possible for the backup tongues 111 to be locked at each of the backup positions contacting the balls 12*a* or 12*b* as well as at a non-backup position. The presser cover 15 can be rotated by loosening the clamping bolt 16 enough to allow the second projection 152 of the cover 15 to come out of the through-hole 81 of the lever mount 8.

The modified lever assembly of FIGS. 10 to 12 operates substantailly in the same manner as the foregoing embodiment. In short, the control lever 3 can be pivoted clickingly in six stages or seven stages or steplessly without any clicks.

According to the illustrated examples, the click ring 9 are divided into the four angularly displaced zones A, A', B, B' each diametrically opposite pair of which have the same number of clicking recesses 91 or 92 in identical arrangement, consequently providing two kinds of click patterns in total. However, the four angular zones of the click ring 9 may differ from one another in the number and/or arrangement of their respective clicking recesses to provide four kinds of click patterns. In this case, the mode selector must be designed to back up only one of the four balls 12 at a time.

The click ring 9 may also be divided angularly at a interval of 120 degrees into three zones which respectively have differently patterned rows of clicking recesses to provide three different click modes while increasing the angular range of pivotal movement of the control lever 3 to 120 degrees.

In addition to the groups of clicking recesses 91, 92 formed in one side wall of the click ring 9, the other side wall of the click ring 9 may also be formed with other patterns of clicking recesses, so that an increased number of click modes are attainable by simply turning over the click ring 9.

In another modification, the three main components 9, 10, 11 of the click mechanism 6, which are arranged in juxtaposition according to the illustrated examples, may be replaced by first to third rings or cylinders which differ in diameter and are disposed one within another. The first cylinder corresponding to the illustrated click ring 9 is formed on its inner circumference with differently patterned rows of clicking recesses. The second cylinder which is equivalent to the illustrated retainer 10 is disposed within the first cylinder and has accommodating holes in the wall thickness thereof for loosely receiving steel balls in corresponding relation to the clicking recess rows. The third cylinder corresponding to the illustrated mode selector 11 is arranged within the second cylinder and provided on its outer circumference with a backup bulge for backing up a selected one of the balls. Naturally, this modification can fulfill substantially the same function as the illustrated examples.

The click ring 9 may be made to rotate slightly relative to the lever boss portion 33 by increases in a circumferential dimension of the notches 44 relative to that of the ears 93. Such specific arrangement for permitting a loose fitting of the ears 93 in the notches 44 result in that the click ring 9 and the lever 3 enable a known overshift operation of the lever 3. The possibility for the overshift operation of lever 3 can be also realized by making the balls 12 slightly movable circumferentially of the retainer ring 10 or by providing a small gap between the circular section 53*a* of the pawl seating space 53 and the circular base 55*a* of the ratchet pawl 55.

It is obvious that the present invention may be varied in many ways besides the illustrated examples and the above described modifications. Such variations are not to be regarded as a departure from the spirit and scope of the invention, and all such modifications as would be obvious to those skilled in the art are intended to be included within the scope of the following claims.

I claim:

1. A bicycle speed change lever assembly comprising:
   a support shaft fixed to a bicycle frame;
   a control lever having a hollow boss portion rotatable about said support shaft and having a handle portion integral with and extending from said boss portion;
   an annular internal space formed in said boss portion;
   a click member accommodated within said internal space and co-rotatable with said boss portion;
   said click member having an operative surface provided with at least two arcuate series of clicking recesses which are disposed in angularly displaced zones and different in pattern;
   a retainer disposed in facing relation to said operative surface of said click member and non-rotatable relative to the support shaft;
   a plurality of rolling elements loosely retained by said retainer in corresponding relation to said rows of clicking recesses and having a diameter larger than a wall thickness of said retainer;
   a mode selector disposed adjacent to said retainer so that said retainer is interposed between said mode selector and said click member;
   said mode selector being angularly adjustable to take a selected one of angular positions;
   means for locking said mode selector at said selected one of angular positions; and
   said mode selector being formed with at least one backup portion for forcing a selected one of said rolling elements into elastic abutment with said operative surface of said click member at a corresponding series of clicking recesses and with at least one groove for preventing other said rolling elements from being in elastic abutment with said operative surface of said click member.

2. The lever assembly as defined in claim 1, wherein said operative surface is provided by one side surface of said click member; and
   said click member, said retainer and said mode selector are arranged in juxtaposition,
   said click member being urged by elastic means toward said mode selector.

3. The lever assembly as defined in claim 2, wherein said backup portion is formed on one side surface of said mode selector,
   said one side surface of said mode selector facing said retainer and having an annular groove formed therein defining said at least one groove for retraction thereinto of said rolling elements; and
   at least one portion of said annular groove is interrupted by said backup portion which is in the form of a bulge formed on said one side surface of said mode selector.

4. The lever assembly as defined in claim 3, wherein said means for locking comprises a plurality of positioning recesses formed on the other side surface of said mode selector and aligned in a circle at a contant angular interval, and a locking member non-rotatable relative to said support shaft and having at least one engaging protuberance fitted in a selected one of said positioning recesses.

5. The lever assembly as defined in claim 2, wherein said mode selector is in the form of a ring plate provided on its outer circumference with at least one radially outward tongue serving as said backup portion.

6. The lever assembly as defined in claim 5, further comprising
   a presser cover centrally having an axially inward annular projection provided on its outer circumference with a plurality of equiangularly spaced spline grooves; and
   said mode selector in the form of said ring plate being fitted on said axially inward annular projection and formed on its inner circumference with at least one radially inward projection which is engaged with a selected one of said spline grooves.

7. The lever assembly as defined in claim 1, wherein at least one of said clicking recesses is circumferentially elongated.

8. The lever assembly ad defined in claim 2, further comprising
   a lever mount non-rotatably mounted on said support shaft;
   said boss portion of said control lever and said click member being rotatably supported on said lever mount;
   said retainer being non-rotatably mounted on said lever mount.

9. The lever assembly as defined in claim 8, wherein said mode selector is rotatably mounted on said lever mount.

* * * * *